United States Patent [19]

Deckler

[11] Patent Number: 5,235,922
[45] Date of Patent: Aug. 17, 1993

[54] PLANTER WITH EQUALIZER BETWEEN GAUGE WHEELS

[75] Inventor: Harry C. Deckler, South Bend, Ind.

[73] Assignee: Allied Products Corporation, Chicago, Ill.

[21] Appl. No.: 3,263

[22] Filed: Jan. 15, 1979

[51] Int. Cl.$^5$ .......................... A01C 5/06; A01C 7/20
[52] U.S. Cl. .................................. 111/137; 111/164; 172/239; 172/395; 172/421; 172/538
[58] Field of Search ......................... 111/59, 61–66, 111/84, 85, 81, 88, 86, 83; 172/538, 156, 397, 239, 669, 395, 743

[56] References Cited

U.S. PATENT DOCUMENTS

| | | |
|---|---|---|
| 370,611 | 9/1887 | Evans .................... 111/85 |
| 511,814 | 1/1894 | Starks et al. ............ 111/85 |
| 1,233,010 | 7/1917 | Altgelt .................. 111/62 |
| 1,882,603 | 10/1932 | Honer .................... 111/85 |
| 2,120,331 | 6/1938 | Huxley ................... 111/84 |
| 2,191,929 | 2/1940 | Strandlund .............. 172/395 |
| 2,603,138 | 7/1952 | Rafferty ................ 172/538 X |
| 2,685,243 | 8/1954 | Cole ..................... 111/88 X |
| 2,947,372 | 8/1960 | Olson .................... 111/66 X |
| 3,115,853 | 12/1963 | Gellner ................. 172/397 X |
| 3,499,495 | 3/1970 | Pust ..................... 172/558 |
| 3,999,690 | 12/1976 | Deckler .................. 222/367 |
| 4,009,668 | 3/1977 | Brass et al. ............ 111/88 X |

FOREIGN PATENT DOCUMENTS

| | | | |
|---|---|---|---|
| 247550 | 3/1963 | Australia ............... 172/239 |
| 2415421 | 8/1979 | France ................... 111/86 |
| 677842 | 8/1952 | United Kingdom ........ 111/85 |

Primary Examiner—Steven A. Bratlie
Attorney, Agent, or Firm—Lockwood, Alex, FitzGibbon & Cummings

[57] ABSTRACT

For multi-row planting a seed planter having furrow-opening discs and associated gauge wheels the independent support arms of which are operatively interconnected by an equalizer arm whereby the combined load carried by the gauge wheels is distributed substantially equally therebetween so as to compensate for ground surface irregularities encountered by the gauge wheels. The distance a planter rises when a gauge wheel rolls over a stone is cut in half thereby reducing shock and minimizing interference with seed metering and dispensing. The equalizer arm may be mounted on adjustable support linkage whereby the gauge wheels may be positioned at different heights for different depth furrows.

5 Claims, 3 Drawing Sheets

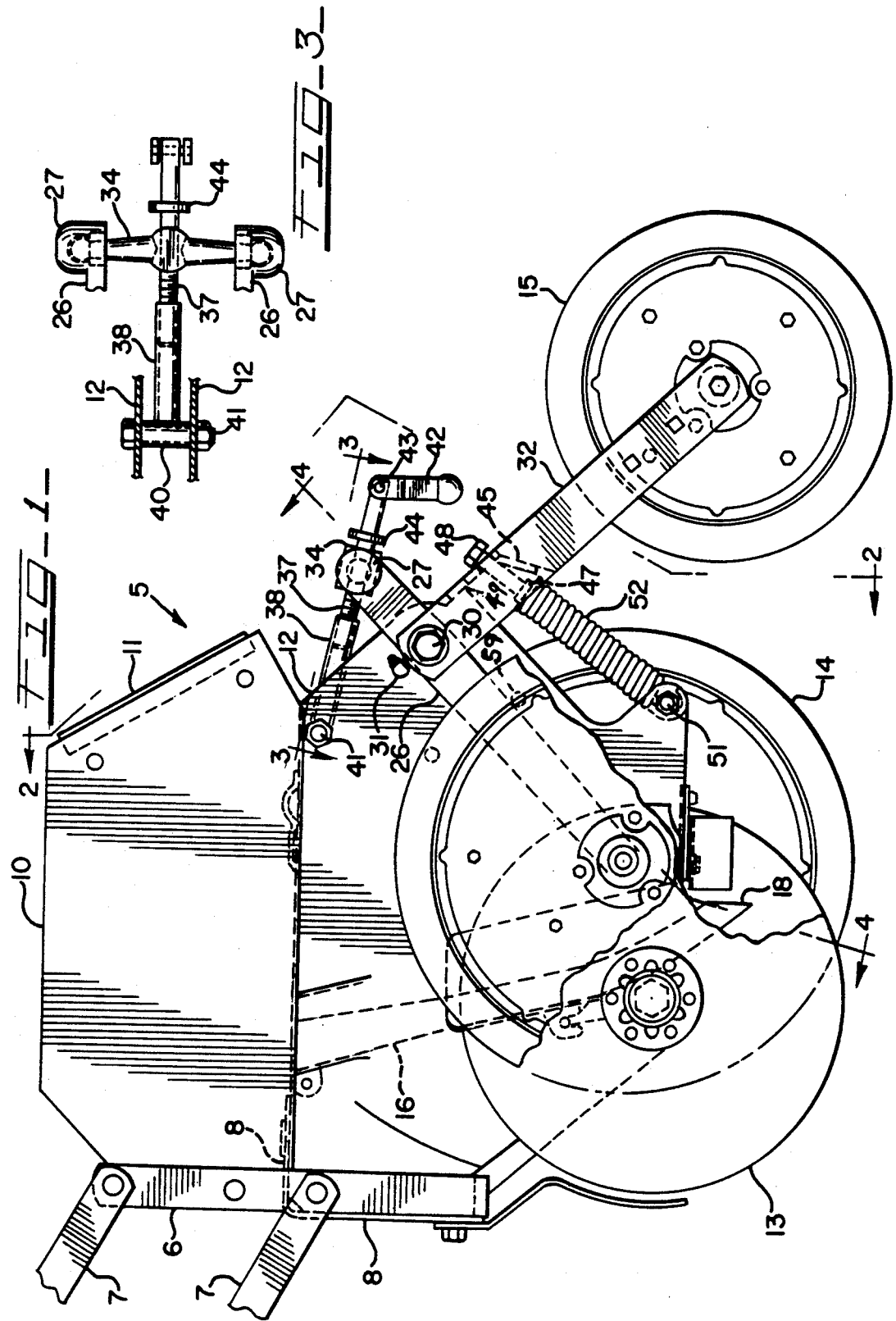

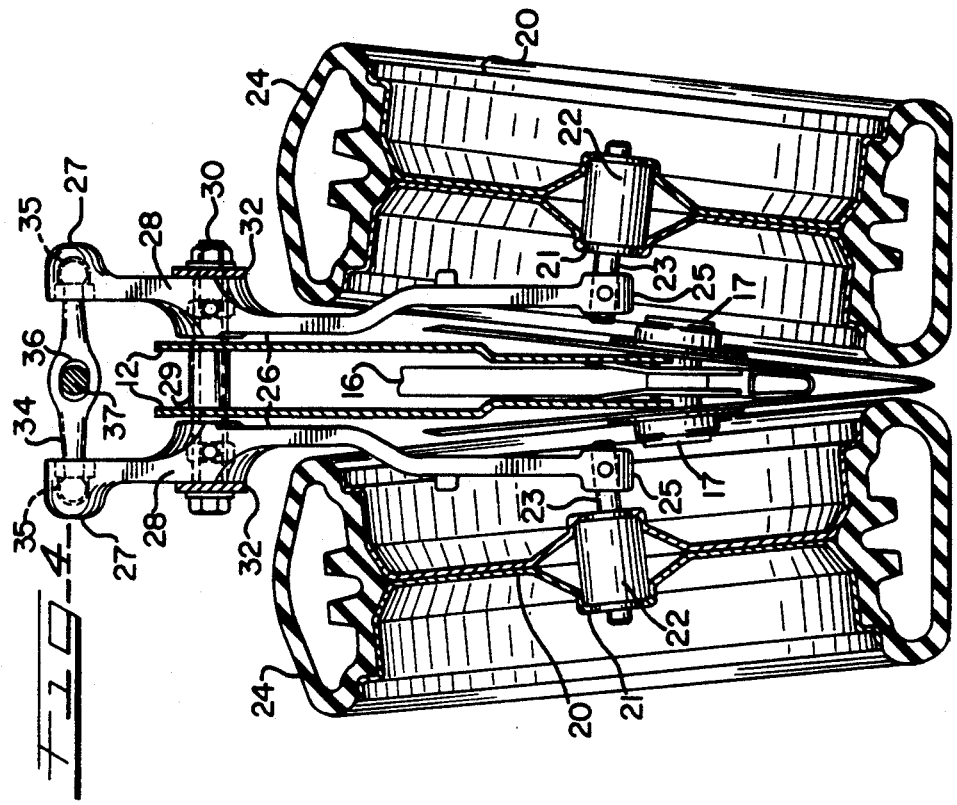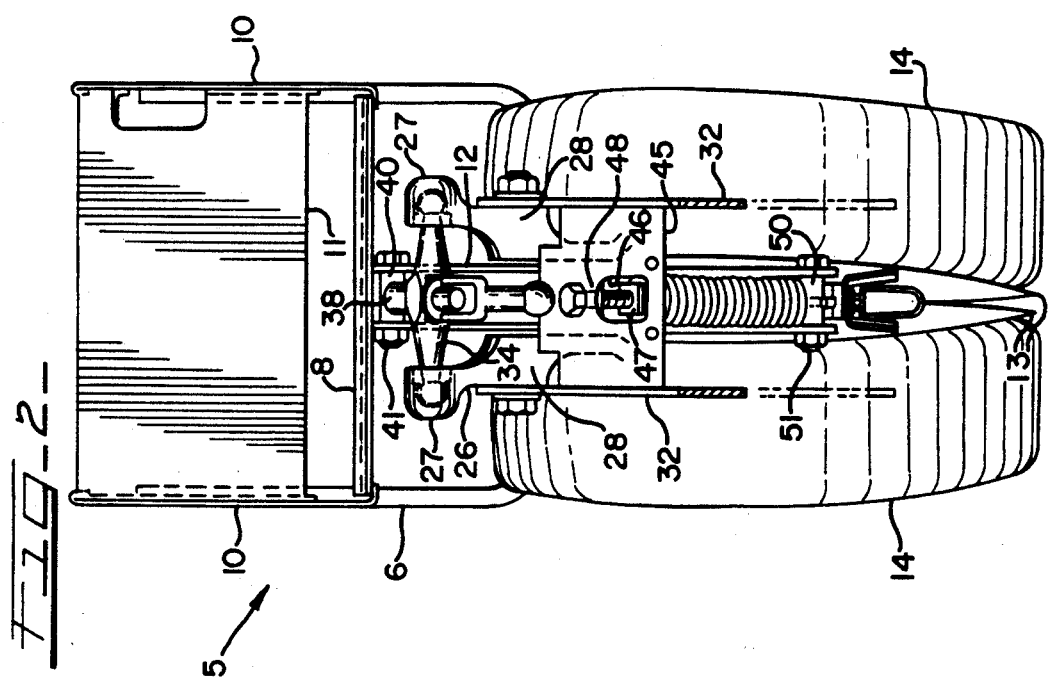

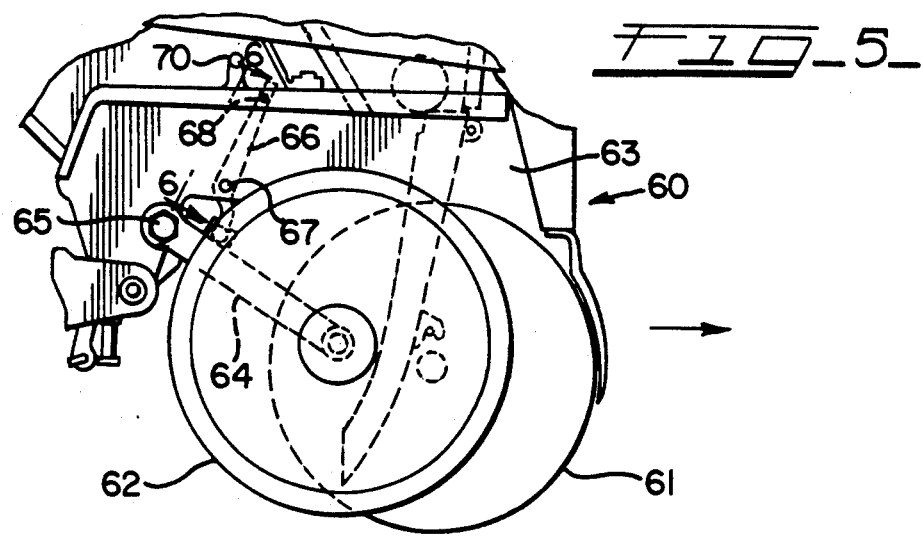
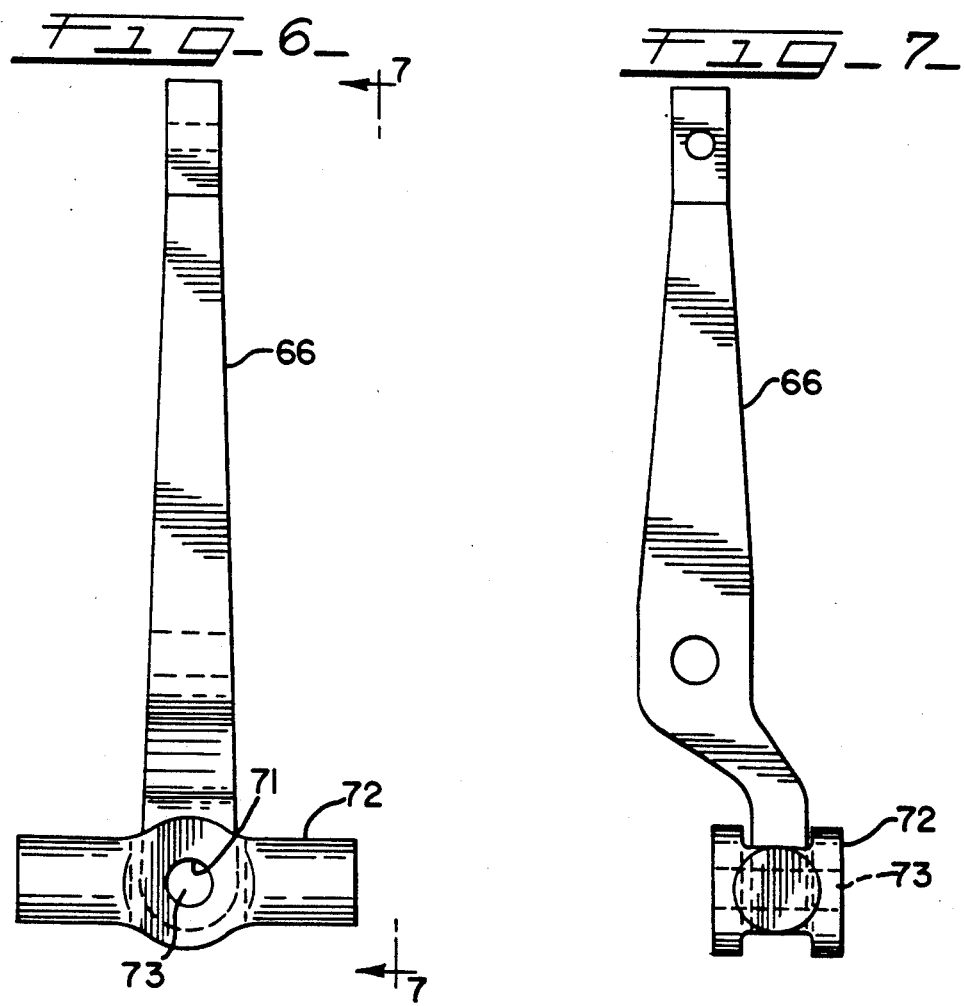

PLANTER WITH EQUALIZER BETWEEN GAUGE WHEELS

This invention relates generally to innovations and improvements in seed planters of the type mounted in a gang to plant multi-rows of such crops as corn and soybeans. Typically, a plurality of separate planter units will be suitably mounted on a tool bar or other supporting frame permitting cross-country transport when not lowered for planting. In the transport condition, the planters will usually be supported on rubber-tired ground wheels which can be retracted so as to place the weight of the implement on the planter units when they are in operation in the planting mode. Each individual planter typically includes a pair of furrow-opening discs with a pair of gauge wheels mounted adjacent to and somewhat rearwardly of the discs so as to be in a position to ride over the soil on opposite sides of the discs and limit the depth to which the furrow-opening discs penetrate the soil and form a furrow. Rearwardly of the furrow-opening discs and associated gauge wheels, furrow-closing means are located which may take the form of a single press wheel or a pair of furrow-closing wheels.

Planters of the foregoing general type to which the present invention relates are disclosed in prior art patents including Pust U.S. Pat. No. 3,499,495, Deckler U.S. Pat. No. 3,999,690, and Brass et al U.S. Pat. No. 4,009,668.

The present invention relates particularly to the manner in which the gauge wheels associated with the furrow-opening discs are mounted and operatively interconnected by an equalizer arm so that as the gauge wheels separately encounter or pass over irregularities in the soil on opposite sides of the furrow-opening discs, the gauge wheels will rise and fall in opposition to one another and the load shared by the wheels will remain substantially equal and constant. Thus, the more adverse the field conditions, such as the presence of numerous stones and in the case of reduced tillage practices, the more beneficial the present invention becomes.

In currently available planters having dual gauge wheels, the supports for the gauge wheels are mounted so that if one gauge wheel encounters a soil irregularity or an obstacle such as a rock, the entire load will be carried by the one gauge wheel as it rolls over the rock. Accordingly, with currently available planters about the only time the load on the gauge wheels is equally distributed is when the soil surface is perfectly level and free of obstacles. Such an ideal condition seldom exists due to natural soil variations and unevenness, various tillage practices and the presence of stones or rocks.

As a practical matter, under most planting conditions, the gauge wheels encounter various irregularities and obstacles causing one of a pair of gauge wheels to carry all or most of the load while the other carries little or none. For example, such a condition occurs when one of the gauge wheels rides over a rock or stone. With conventional planters, this places or transfers all of the shared load to the one wheel as it rides over the stone, removing the load from the associated gauge wheel. Such uneven distribution of the load as the planter passes over a field is objectionable for several reasons. It results in variations in the formation of the furrow which is opened by the discs in that the discs will be lifted temporarily when one gauge wheel rolls over an obstacle and the opposite sides of a furrow will not be pressed down uniformly when one gauge wheel passes over a depression. Further, depending on the size of a stone or other obstacle, the planter unit is subjected to shock and the metering and dispensing of the seed tends to be interferred with or disrupted temporarily. By means of the present invention, such disadvantages are eliminated or at least minimized.

Accordingly, the object of the present invention, generally stated, is the provision of means for mounting the dual gauge wheels of a planter unit of the foregoing type whereby the support arms for the gauge wheels will be operatively interconnected by means of an equalizer arm or rod so that as the gauge wheels encounter irregularities or obstacles in or on the soil or ground surface and tend to rise or fall with respect to each other, the shared load carried by each of the gauge wheels will tend to be substantially equalized. When one wheel rides over an obstacle in its path, the planter instead of being temporarily lifted the full height of the obstacle, carrying with it the furrow-opening discs, lifts only half the height of the obstacle. Accordingly, operation of the planter is smoother, shock is minimized, interference with or disruption of seed metering and dispensing is minimized, and the compacting pressure exerted by the gauge wheels on the opposite sides of the furrow opened by the furrow-opening discs will be substantially uniform.

For a more complete understanding of the nature and scope of the invention, reference may now be had to the following detailed description of two presently preferred embodiments taken in connection with the drawings wherein:

FIG. 1 is a side elevational view, partly broken away, of one planter unit of a multi-row planter which unit embodies the present invention, the seed hopper and certain other parts not being shown;

FIG. 2 is a rear elevational view taken on line 2—2 of FIG. 1;

FIG. 3 is a detail top plan view taken on line 3—3 of FIG. 1;

FIG. 4 is a sectional view taken on line 4—4 of FIG. 1;

FIG. 5 is a fragmentary side elevational view of a planter unit embodying a second form of the invention;

FIG. 6 is a view on enlarged scale taken on line 6—6 of FIG. 5;

FIG. 7 is an elevational view taken on line 7—7 of FIG. 6.

In FIG. 1, a planter unit is indicated generally at 5 equipped at the front end with a vertical support or frame member 6 by which the unit may be suspended from a tool bar or the like (not shown) in known manner by means of parallel linkage members 7—7. There is a pair of the linkage members 7—7 on each side of the unit 5 pivotally connected to the frame member 6. The lower portions of the vertical members 6 are interconnected by means of an inverted L member 8, the vertical leg of which extends between the vertical frame member 6 and the horizontal leg of which extends rearwardly. A pair of vertical side plate members 10 are fastened at their front ends to the upper portions of the vertical side members 6 and the lower front underside edges thereof are mounted or connected to the rearwardly extending leg of the L member 8. The rear inclined edges of the plate members 10 are interconnected by means of an inclined plate member 11.

A pair of vertical frame members 12—12 are supported from the front by the L member 8 and serve as frame means to support a pair of furrow-opening discs 13—13, a pair of gauge wheels 14—14 and a press wheel or furrow-closing wheel 15.

It will be understood that a seed dispensing mechanism such, for example, as the one described in the U.S. Pat. No. 3,999,690 may be supported between the plates 10 and on top of which mechanism there will be mounted the seed hopper. Such seed dispensing means (not shown) will serve to dispense seed to be planted into the upper end of a downwardly and rearwardly inclined chute 16.

The furrow-opening discs 13—13 are supported in known manner by means of bearings 17—17 fixedly mounted or secured to the lower front portions of the vertical frame members 12—12. The bearings 17 are mounted on the frame members 12 in such manner that axes of the discs 13 intersect and the peripheral cutting edges of the discs 13 are juxtaposed at the lower front portions thereof at approximately the seven o'clock position as shown in FIGS. 1 and 4. The discs then diverge upwardly and rearwardly being spaced furthest apart at approximately the one o'clock position as viewed in FIG. 1. With the discs 13 mounted in this manner, they serve to cut and open a V-shaped furrow in the ground as the planter unit 5 is propelled forwardly (i.e. to the left as viewed in FIG. 1).

The lower end of the feed chute 16 is rearwardly curved and terminates as indicated at 18 in FIG. 1 between the discs 13 at approximately the four-thirty o'clock position as viewed in FIG. 1. The mounting of the furrow-opening discs 13 and the feed chute 16 is conventional and does not constitute a part of the present invention.

As stated above, the present invention is primarily concerned with the manner in which the gauge wheels 14—14 are mounted with respect to each other and the furrow-opening discs 13. The gauge wheels 14 are of known construction and each comprises a pair of stamped disc members 20—20 which are generally dish-shaped with center hub receiving portions 21—21. A pair of the dish-shaped members 20 are clamped together on opposite sides of a bearing 22 so that the bearing is fitted between the hub portions 21 while the flat inner disc portions of the members 20 engage each other as shown in FIG. 4. The bearings 22 are mounted on spindles 23 so that each of the wheels 14 is rotatable on its respective spindle and axis. The peripheries or outer margins of the disc members 20 are complimentarily shaped so as to receive therebetween and around the inner periphery of a hollow tire 24. The inner ends of the spindles 23 are rigidly mounted in eyes 25—25 formed on the lower ends of a pair of support arms 26—26. The spindles 23—23 are so oriented that the axes of rotation of the wheels 14 intersect and are nonparallel with respect to the axes of rotation of the furrow-opening discs 13. By means of this arrangement, when weight is applied to the gauge wheels 14, the tires 24 are deformed so that the inner portions thereof bulge inwardly and ride against the outer peripheral surfaces of the discs 13 at approximately the place where the discs leave the soil, as shown in FIG. 4. The construction of the wheels 14 and the manner in which they are mounted on intersecting axes with respect to the discs 13 are known and do not form part of this invention.

The gauge wheel supporting arms 26 are of like construction and, in addition to the eyes 25 at the lower ends thereof, they have sockets 27—27 formed at the upper ends thereof. Adjacent their upper ends, the gauge wheels supporting arms 26 are provided with hub formations 28—28 which have openings extending therethrough for receiving opposite ends of a bushing 29 having an enlarged central portion to the opposite ends of which the vertical frame members 12 are welded. A spindle in the form of a long bolt 30 extends through the bushing 29. Thus, the arms 26 are pivoted intermediate their ends on the bushing 29. Each of the hub portions 28 is provided with a lubrication fitting 31 (FIG. 1) since, in operation of the planter, there will be considerable pivoting action of the arms on the spindle 30.

The opposite ends of the bolt 30 carry short bushings which serve to pivotally support a pair of rearwardly and downwardly extending press wheel support arms 32—32. The head on one end of bolt 30 and the nut on the other end secure the assembly together as shown in FIG. 4. The upper ends of the gauge wheel support arms 26 are interconnected by an equalizer arm 34 (FIG. 4), the opposite ends of which have ball formations 35—35 which fit in the sockets 27—27. At its center portion, the arm 34 is somewhat enlarged and provided with an opening 36 through which extends a bolt 37, the inner threaded end of which screws into the threaded end of a hollow tube member 38.

A sleeve bushing 40 (FIG. 3) is transversely secured at its center to the end of the tubular member 38 and is pivotally mounted on a bolt 41 extending between the plates 12—12. On its outer end, the bolt 37 carries a handle 42 which is pinned thereto at 43 (FIG. 1) and which may be used to screw the bolt 37 into and out of the tubular member 38. The tubular member 38 and the bolt 37 together form an adjustable link which is pivotally connected or mounted on the horizontal bolt 41 secured to the frame members 12 of the planter unit 5.

The opening 36, in the equalizer arm 34, is elongated as shown in FIG. 4 so that this equalizer arm may not only rotate or pivot with respect to the longitudinal axis of the bolt 37, but can also pivot in a plane which includes the longitudinal axes of the bolt 37, tube 38 and equalizer arm 34. A stop collar 44 is rigidly secured to the bolt member 37 so as to limit the rearward sliding movement of the equalizer arm 34 on the bolt 37.

The furrow-closing wheel or press wheel 15 may be of known construction such, for example, as the one shown in FIG. 1 of U.S. Pat. No. 3,999,690. This wheel is mounted for rotation on suitable bearings carried between the lower ends of the arms 32. These arms are rigidly secured together by means of a formed plate 45 (FIG. 2) secured therebetween. A central portion of the plate 45 is cut away at 46 (FIG. 2) to provide clearance for a threaded adapter 47 screwed into the upper end of spring 52. The opening 46 also allows visual estimation of the approximate tension on the spring 52 by observing the remaining unused threads on a bolt 48 the head of which bears on the upper leg of plate 45. The lower end of spring 52 is pivotally connected to the side plates 12—12 by means of a bolt 51 extending through the bushing portion 50 screwed into the lower end of the spring 52.

It will be seen that by adjusting the bolt 48 in the adapter 47, it is possible to adjust the tension exerted by the spring 52. By adjusting the tension on the spring 52, the portion of the weight of the planter 5 that is carried by the press wheel 15 and the portion carried by the gauge wheels 14 may be changed as desired. In this way the pressure of force with which the press wheel 15 acts to close the furrow with the seed deposited therein may be adjusted as desired and in known manner.

Downward pivoting of the press wheel support arms 32 due to the tension exerted by spring 52 and the weight of the press wheel 15 is limited by the engagement of the upper leg of the plate 45 with the rear corner extension 49 (FIG. 1) of the frame plates 12.

It will be seen that when the planter unit 5 is in its raised position as it will be in transport, the gauge wheels 14 will be free to fall under their own weight and pivot downwardly on the bushing 29. This downward pivoting action is limited by engagement of the gauge wheel support arms 26 with the projecting ends of a stop pin 59 (FIG. 1) carried by the frame plates 12. On the other hand, when the planter 5 is in its operating condition and resting partially on the gauge wheels 14, the press wheel 15, and the discs 13, then the upward pivoting action of the gauge wheels 14 will be limited by engagement of the center portion of the equalizer arm 34 against the stop collar 44.

The manner in which the equalizer arm 34 operates to maintain the load borne by the gauge wheels 14 equally distributed therebetween will now be described. It will be seen that, should the right-hand gauge wheel 14 as viewed in FIGS. 2 and 4 encounter an obstacle such as a stone, that wheel will rise in order to ride over that obstacle. In doing so, the right-hand support arm 26 will pivot in a clockwise direction about the spindle 30 as viewed in FIG. 1. This clockwise pivoting action of the right-hand support arm 26 produces a lowering of the upper socketed end 27 of the right-hand support arm 26 and, in turn, a lowering of the right-hand end of the equalizer arm 34. This lowering of the right-hand end of the equalizer arm 34 causes it to pivot on the bolt 37 producing an upward movement of the opposite end of the equalizer arm 34 and, in turn, an upward movement of the upper socketed end 27 of the left-hand support arm 26. The upward movement of the upper socketed end 27 of the left-hand support arm 26 causes the left-hand support arm 26 to pivot counterclockwise about the spindle 30 thereby producing a lowering action on the left-hand gauge wheel 14 which will be equal to the rising action of the right-hand gauge wheel. As a result of this action, the frame of the planter rises only one half the height a gauge wheel rises in passing over a stone or other obstacle. Accordingly, the shock on the planter 5 is minimized as disruption with the seed metering and dispensing. Also of importance is the fact that the discs 13 lift only half the normal distance and thereby interference with furrow formation is significantly reduced.

Conversely, should the right-hand gauge wheel 14 encounter a depression in the ground and tend to fall, then just the opposite action will be produced by the equalizer arm 34. That is, the left-hand gauge wheel 14 will be lifted the same extent that the right-hand gauge wheel 14 drops. In this manner, the weight of the planter unit 5 that is borne by the gauge wheels 14, depending on the setting of the spring 52, will be shared or distributed substantially equally between the left-hand and right-hand gauge wheels 14 as they encounter irregularities in the surface of the ground adjacent their respective furrow-opening disc 13. Accordingly, the force or pressure exerted on opposite sides of the furrow opened by the discs 13 will be maintained substantially equal as the planter unit traverses the ground.

In FIGS. 5-7, a second form of the invention is shown in association with a seed planter indicated generally at 60. The planter includes a pair of furrow-opening discs 61 and a pair of gauge wheels 62 mounted somewhat rearwardly thereof, as shown. The discs 61 and gauge wheels 62 are suitably supported and mounted on the planter frame 63, the gauge wheels being mounted on the lower ends of a pair of support arms 64. The upper ends of the support arms 64 are pivotally attached to the frame 63 by a bolt or spindle 65. The adjustment for the height at which the gauge wheels 62 operate, and thereby the furrow depth is controlled, is provided by means including a bell crank lever or dog-leg 66 pivotally mounted intermediate its ends at 67 on the planter frame so as to extend downwardly therein between the gauge wheels 62. The upper end of the link or lever 66 is pivotally connected at 68 to a shifter 70 slidably mounted on the frame for placing the lever in different positions and thereby vary the extent to which the support arms can lift under the weight of the planter.

An equalizer arm 72 is pivotally mounted on the lower end of the lever 66 by means of a pin 73 extending through a central opening in the arm 72 registering with an opening in the lower end of lever 66. As shown in FIG. 5, the undersides of the opposite ends of the equalizer arm 72 engage the upper edges of the support arms 64 for the gauge wheels 62. With this arrangement, any time one of the gauge wheels 62 encounters an obstacle or irregularity in its path, and rises or falls as a result thereof, it will produce an equal but opposite reaction or movement of the other gauge wheel 62 and thereby maintain the equal distribution of load on the gauge wheels 62.

By using the shifter 70 to shift and place the lever 66 in different angular positions, the equalizer arm 72 will engage the gauge wheel support arms 64 at different distances from the bolt or spindle 65. In this manner, the depth to which the gauge wheels 62 allow the discs 61 to cut into the soil may be varied.

What is claimed as new is:

1. In a seed planter having frame means, furrow-opening means mounted on said frame means comprising a pair of opposed discs rotatable on intersecting axes whereby the discs diverge upwardly and rearwardly from juxtaposed soil cutting edges forwardly of their axes, a pair of gauge wheels rotatably mounted on the lower ends of support arms which are pivotally mounted on said frame means, seed dispensing means mounted on said frame means and including a seed chute extending downwardly between said discs, and furrow-closing means mounted on said frame means rearwardly of said discs and gauge wheels, the improvement which comprises, an equalizer arm operatively interconnecting said gauge wheel support arms whereby the combined load carried by said gauge wheels remains at least approximately equally divided as the gauge wheels individually encounter irregularities and obstacles in their path of travel, said equalizer arm extending between said support arms and generally transversely to the fore-and-aft longitudinal axis of said planter and being pivotally mounted intermediate its opposite ends on one end of support linkage attached to said frame means for tilting in a generally transverse plane, said gauge wheel support arms being pivotally mounted intermediate their lower and upper ends on said frame means, and the opposite ends of said equalizer arm being pivotally connected to the upper ends of said support arms.

2. In a seed planter as called for in claim 1, said support linkage having a second end which is opposite said one end and said second end being pivotally connected to said frame means.

3. In a seed planter as called for in claim 2, the upper ends of said support arms having socket formations, the opposite ends of said equalizer arm having ball formations fitting within said socket formations, and the central portion of said equalizer arm having an opening permitting universal pivoting on said support linkage.

4. In a seed planter having frame means, furrow-opening means mounted on said frame means comprising a pair of opposed discs rotatable on intersecting axes whereby the discs diverge upwardly and rearwardly from juxtaposed soil cutting edges forwardly of their axes, a pair of gauge wheels rotatably mounted on the lower ends of support arms which are pivotally mounted on said frame means, seed dispensing means mounted on said frame means and including a seed chute extending downwardly between said discs, and furrow-closing means mounted on said frame means rearwardly of said discs and gauge wheels, the improvement which comprises, an equalizer arm operatively interconnecting said gauge wheel support arms whereby the combined load carried by said gauge wheels remains at least approximately equally divided as the gauge wheels individually encounter irregularities and obstacles in their path of travel, said equalizer arm extending between said support arms and generally transversely to the fore-and-aft longitudinal axis of said planter and being pivotally mounted intermediate its opposite ends on one end of support linkage attached to said frame means for tilting in a generally transverse plane, said gauge wheel support arms being pivotally mounted adjacent their upper ends to said frame means and the opposite ends of said equalizer arm riding on the upper sides of said support arms, and said support linkage comprising a lever pivotally connected intermediate its opposite ends to said frame means.

5. In a seed planter as called for in claim 4, said support linkage having a second end which is opposite said one end, and shifting means slidably mounted on said frame means and pivotally connected to said second end of said lever for positioning said lever in different angular positions to thereby regulate furrow depth.

* * * * *